Figure 1:
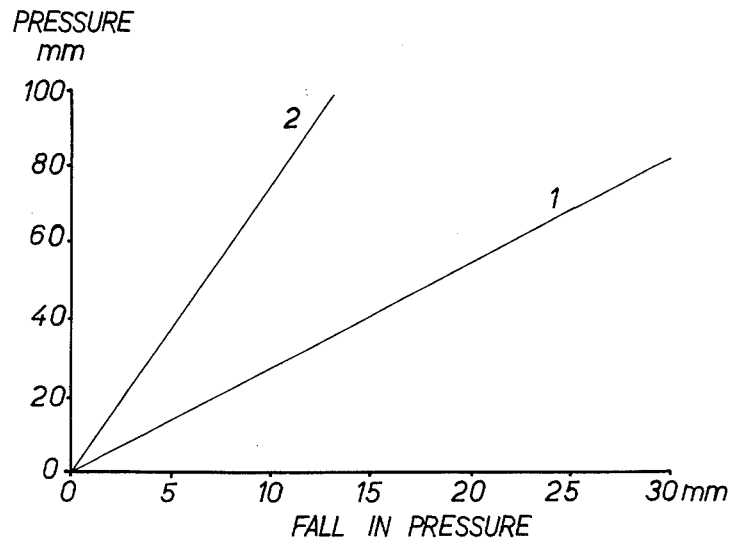

Jan. 16, 1962  H. EBNETH  3,016,575
METHOD OF MOLDING OPEN PORE ISOCYANATE FOAM
Filed March 11, 1957  2 Sheets-Sheet 1

INVENTOR.
HAROLD EBNETH
BY
ATTORNEY

Jan. 16, 1962  H. EBNETH  3,016,575
METHOD OF MOLDING OPEN PORE ISOCYANATE FOAM
Filed March 11, 1957  2 Sheets-Sheet 2

INVENTOR.
HAROLD EBNETH
BY
ATTORNEY 3,016,575
METHOD OF MOLDING OPEN PORE
ISOCYANATE FOAM
Harold Ebneth, Leverkusen, Germany, assignor, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
Filed Mar. 11, 1957, Ser. No. 645,160
Claims priority, application Germany Mar. 14, 1956
6 Claims. (Cl. 18—48)

This invention relates to a process for the production of isocyanate foam having open pores.

It is well known to produce isocyanate foam by reacting polyhydroxyl compounds with polyisocyanates and water or by reacting polycarboxylic compounds with polyisocyanates. In carrying out these reactions, the components are usually mixed with a so-called activator mixture containing a reaction accelerator and an emulsifier, and the liquid foamable mixture thus produced is poured into a receptacle where the formation of a solid plastic foam takes place (see, for example, U.S. Patent 2,764,565).

The isocyanate foam obtained by the conventional methods has a great many very desirable properties, such as resistance to aging and organic solvents, but suffers from the disadvantage of having only a limited air permeability and a small absorption capacity for water since most of its cells are closed. Therefore, attempts have been made to produce isocyanate foam with open pores but heretofore no commercially feasible method for accomplishing this result has been found. By subjecting isocyanate foam to an aftertreatment with acid or alkaline agents, it is possible to partly open the cells of the foam but this aftertreatment is time-consuming and entails the use of chemicals which unless completely removed from the foam may cause hydrolytic degradation thereof.

It is, therefore, a primary object of the present invention to provide a process for the production of isocyanate foam with open pores which can be carried out in a simple and economical manner. Another object of the invention is to provide a process for the production of isocyanate foam with open pores which avoids the use of costly and potentially harmful chemicals. A further object is to provide a process for the production of isocyanate foam having an increased air permeability and an improved water absorption capacity. Still further objects will appear hereinafter.

These objects are accomplished in accordance with the present invention by removing the surface skin, forming on the foam in the course of its preparation, immediately after the completion of the expansion process, that is to say, immediately after the expanding molded body has reached its maximum volume, i.e. shortly after the end of the carbon dioxide evolution. This point cannot properly be defined in minutes or by the properties of the foam in this moment, both these features depending on the specific foam formulation in each case. In other words, the essential characteristic is the instant of greatest volume the foamed body reaches in the expansion process. The removal of the surface skin can be effected by various methods, which will now be described in detail.

In a specific embodiment of the invention, the surface skin is removed by a simple stripping operation. One way of carrying out such a stripping operation comprises placing an absorbent sheet on the surface skin immediately after completion of the foaming process, and pulling off said sheet after a period of a few seconds during which it became bonded to the surface skin, thus removing the sheet along with skin adhering to it. In general, it suffices to leave the absorbent sheet on the surface skin for a period of about 3 to 5 seconds before pulling it off. As the absorbent sheet to be placed on the surface skin, foam sheets or plastic sheets may be used. Particularly good results are obtained with sheets of moistened paper and fabrics. When operating continuously, the sheet can be applied and removed by means of rollers. After the removal of the sheet and the surface skin adhering thereto, the foam is preferably placed under a vacuum to complete the opening of the pores.

Another method of removing the surface skin according to the instant invention involves the use of mechanical means, such as grinding devices, rotating scrapers, saws operating at a high speed or cutting with heated wires.

In accordance with a third embodiment of the process of the invention, the foamed material is passed through a vacuum bell immediately after completion of the expansion process. In this manner the surface skin is removed by suction, which also brings about an opening of the pores located in the interior. The vacuum to be applied in the instant process may vary between 20–600 mm. Hg and preferably between 100–400 mm. Hg although it may be possible to deviate from these data. In general, a residence time of a few seconds such for instance 1–5 seconds, beneath the vacuum bell is sufficient to carry out this procedure.

The production of the isocyanate foam to be subjected to the process of the invention is carried out by methods which are known per se. In the first step, there is prepared a foamable mixture from a polyhydroxy compound, a polyisocyanate, water and one or more reacting-influencing components, such as accelerators and emulsifiers.

As the polyhydroxy compound, there may be employed any polyhydroxy compound commonly utilized in the manufacture of isocyanate foam, such as hydroxyl polyesters obtained by thermal esterification of polybasic organic acids with polyhydric alcohols, isocyanate-modified polyesters containing terminal hydroxyl groups and prepared by reacting an hydroxyl polyester with a diisocyanate, polyhydroxyl ethers obtained, for example, by polymerization of alkylene oxides or oxalkylation of polyhydric alcohols, hydroxyl polythioethers obtained, for example, by etherification of thioether glycols, and hydrogenation products of carbon monoxide-ethylene copolymers.

The reaction-influencing components are usually mixtures of an accelerating agent, such as a tertiary amine or a heavy metal compound, with an emulsifier, such as the sulfonation products of fatty alcohols and fatty acids or salts of amines with fatty acids.

Polyisocyanates commonly used in the production of isocyanate foam include 1,2,4-toluylene diisocyanate, 1,2,6-toluylene diisocyanate, technical mixtures of 1,2,4- and 1,2,6-toluylene diisocyanate, p- and m-phenylene diisocyanate, 4,4'-diphenylmethane diisocyanate, naphthylene-1,5-diisocyanate, triphenylmethane-4,4',4''-triisocyanate, 4,4'-diphenyl dimethylmethane diisocyanate, etc.

In preparing the foamable mixture, the components are mixed in the commonly employed proportions. Ordinarily 0.5 to 1.5 mol of diisocyanate is used per gram equivalent of OH contained in the polyhydroxyl compound and to the mixture there are added 0.5 to 10% by weight of water, 0.5 to 10% by weight of an emulsifier and 0.1 to 4% by weight of an accelerator, the percentages being based on the weight of the polyhydroxyl compound. Rather than adding the polyhydroxyl compound and the polyisocyanate component separately, it is also possible to form from these two components a so-called prepolymer and to add to this polymer the required amounts of water, emulsifier and accelerator.

In the second step, the liquid foamable mixture obtained from the above components is poured into a suitable receptacle where due to a plurality of chemical reactions the formation of a solid foam takes place. The resultant piece of isocyanate foam serves as the starting material for the process of the invention and is freed from the surface skin immediately after completion of the foaming process as disclosed and described hereinabove.

Details on the chemicals and reaction conditions commonly used in the production of isocyanate foam have been published in the literature, such as DeBell, Goggin and Gloor, "German Plastics Practice," Murray Printing Co., 1946; A. Höchtlen, "Kunststoffe" 40 (1950), pp. 3–14; U.S. Patents 2,577,279; 2,577,280 and 2,764,565. The disclosure of these publications is incorporated herein by reference.

The isocyanate foam obtained by the process of the invention contains a large number of open pores. Due to this fact, it exhibits an air permeability which is 2 to 5 times and a water absorption which is 2 to 3 times as high as those of conventional isocyanate foam. Another most desirable feature of the isocyanate foam produced by the process of the invention is its comparatively small compression hardness which is comparable to that of latex foam.

In view of its high water absorption capacity, the isocyanate foam obtainable by the process of the invention is eminently suitable for use as raw material for the manufacture of sponges. Furthermore, the isocyanate foam prepared by the process of the invention is used in the manufacture of upholstered articles where its high degree of softness creates a feel similar to that of latex foam.

Figure 2:
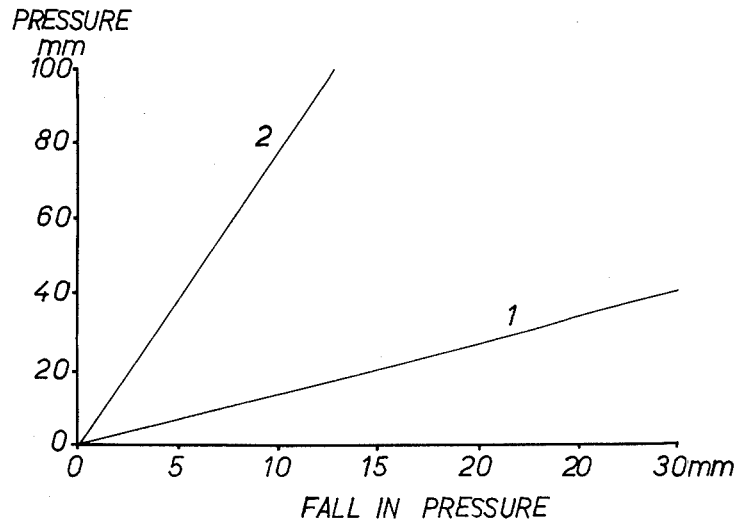
Figure 3:
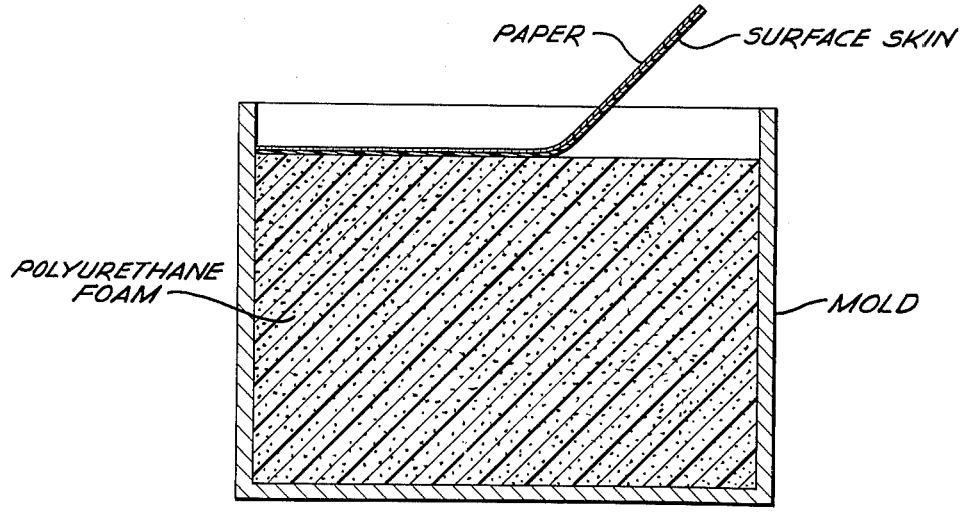

FIGURES 1 and 2 are line graphs showing the air permeability of isocyanate foam in both an untreated and treated condition for the isocyanate foams of Examples 1 and 2 respectively. FIGURE 3 is a diagram of one embodiment of the invention showing the removal of the surface skin of an isocyanate foam with a sheet of moistened paper.

The invention is further illustrated by the following examples without being restricted thereto.

Example 1

Following the procedure of Example 2 of U.S. Patent 2,764,565, a foamable mixture is prepared from the following components:

100 parts of a polyester obtained by thermal esterification of 15 mols of adipic acid, 16 mols of diethylene glycol and 1 mol of trimethylol propane which has the hydroxyl number 60 and an acid number lower than 2,
42.4 parts of toluylene diisocyanate,
10 parts of a mixture consisting of 3 parts of bis-(diethylamino ethanol)-adipate, 1 part of diethylamine oleate, 2 parts of sodium salt of a sulfonated castor oil with 54% of water, 2 parts of sulfonated ricinoleic acid with 54% water, 0.2 part of glycerine, 1 part of water and 0.2 part of paraffin oil.

The foamable mixture is poured into a mold where a polyurethane foam having a bulk density of 40 kg./m.$^3$ is formed.

As soon as the expanding body has reached its maximum volume it is passed under a vacuum bell for 5 seconds the inside pressure of which is 200 mm. Hg.

Curve 1 shows the air permeability of the untreated foam at various pressures while curve 2 shows the corresponding values of a foam of the same composition, the pores of which have been opened by pulling off the surface skin followed by the application of a vacuum as described above. The pressure listed in the diagram is the pressure with which air is blown through a foamed plate having a thickness of 30 cm. After the air has passed through the plate a fall in pressure is observed as shown in the diagram, the fall in pressure being a measure of air permeability.

Example 2

Following the procedure of Example 2 of U.S. Patent 2,764,565, a foamable mixture is prepared from the following components:

100 parts of a polyester obtained by thermal esterification of 15 mols of adipic acid, 16 mols of diethylene glycol and 1 mol of trimethylol propane which has the hydroxyl number 60 and an acid number lower than 2,
33.2 parts of toluylene diisocyanate,
9.5 parts of a mixture consisting of 3 parts of bis-(diethylamino ethanol)-adipate, 1.5 parts of diethylamine oleate, 1.5 parts of sodium salt of a sulfonated castor oil with 54% water, 1 part of water and 0.1 part of paraffin oil.

The foamable mixture is poured into a mold where a polyurethane foam having a bulk density of 55 kg./m.$^3$ is formed.

As soon as the expanding body has reached its maximum volume a moistened paper sheet is placed on the surface skin and pulled off after about 5 seconds. The foam skin adheres to the paper. The foamed block thus treated is then placed under a vacuum bell for 3 seconds the inside pressure of which is 300 mm. Hg.

Curve 1 shows the air permeability of this foam at various pressures while curve 2 shows the corresponding values of a foam of the same composition, the pores of which have been opened by pulling off the surface skin followed by the application of a vacuum as described above.

While certain representative embodiments and details have been shown for the purpose of illustrating this invention, it will be apparent to those skilled in the art that various changes and modifications may be made therein without departing from the spirit and scope of the invention.

What is claimed is:

1. Process for the production of isocyanate foam with predominately open pores throughout its structure which comprises removing the surface skin produced on the surface of said isocyanate foam during the foaming process by applying a sheet to the isocyanate foam immediately upon reaching the completion of the foaming reaction and removing the said sheet together with the said surface skin after bonding of said sheet to the surface skin before curing of said isocyanate foam.

2. The process of claim 1 in which said sheet comprises moistened paper.

3. The process of claim 1 in which said sheet comprises a fabric.

4. Process for the production of isocyanate foam with predominately open pores which comprises mechanically removing the surface skin produced on the surface of said isocyanate foam immediately after completion of the foaming reaction and before complete curing of said isocyanate foam.

5. The process of claim 4 wherein said surface is removed by cutting the foam with a heated wire.

6. A process for the production of isocyanate foam with predominantly open pores throughout its structure which comprises removing the surface skin produced on the surface of said isocyanate foam during the foaming process by applying a sheet to the isocyanate foam immediately upon reaching the completion of the foaming reaction, removing the said sheet together with the said surface skin after bonding of said sheet to the surface skin and passing the foamed material through a vacuum immediately after removing the said sheet and before curing of said isocyanate foam.

References Cited in the file of this patent
UNITED STATES PATENTS
1,345,810    Tomec _ _ _ _ _ _ _ _ _ _ _ _ _ _ _ _ _ _ July 6, 1920

(Other references on following page)

| | | |
|---|---|---|
| 1,529,033 | Merrill | Mar. 10, 1925 |
| 2,218,385 | Schulze | Oct. 15, 1940 |
| 2,296,305 | Roberts | Sept. 22, 1942 |
| 2,327,001 | Schott | Aug. 17, 1943 |
| 2,346,201 | Vautier | Apr. 11, 1944 |
| 2,383,734 | Pfleumer | Aug. 28, 1945 |
| 2,770,241 | Winkler | Nov. 13, 1956 |

OTHER REFERENCES

Dupont booklet, "Urethane Resilient Foams Made from Polyesters," HR-10, February 15, 1956, page 4.

"British Plastics," Many Plastics Foam Under Development, April 1956, page 118–112.